United States Patent [19]

Sloan et al.

[11] Patent Number: 5,121,491
[45] Date of Patent: Jun. 9, 1992

[54] MIDI TO RS 232 INTERFACE

[75] Inventors: Robert Sloan, Sunnyvale; David Evans, Mountainview, both of Calif.

[73] Assignee: Sun Microsystems, Inc., Mountain View, Calif.

[21] Appl. No.: 571,329

[22] Filed: Aug. 22, 1990

[51] Int. Cl.$^5$ .............................................. G06F 3/00
[52] U.S. Cl. .................................. 395/500; 395/275; 84/645
[58] Field of Search ................... 84/645; 364/200, 400; 395/500

[56]  References Cited

U.S. PATENT DOCUMENTS

| | | | |
|---|---|---|---|
| 4,662,261 | 5/1987 | Akutsu | 84/645 |
| 4,700,604 | 10/1987 | Morikawa et al. | 84/645 |
| 4,744,281 | 5/1988 | Isozaki | 84/645 |
| 4,768,412 | 9/1988 | Sanderson | 84/645 |
| 4,776,253 | 10/1988 | Downes | 84/645 |
| 4,945,806 | 8/1990 | Merrill, Jr. | 84/645 |
| 5,011,412 | 4/1991 | Rosenberg | 84/478 X |
| 5,025,701 | 6/1991 | Matsumoto | 84/615 |

Primary Examiner—Michael R. Fleming
Assistant Examiner—Glenn A. Auve
Attorney, Agent, or Firm—Blakely Sokoloff Taylor & Zafman

[57] ABSTRACT

An interface which includes a MIDI send terminal having first and second pins for providing an output signal, an RS 232 terminal having first and second pins for receiving a signal from the MIDI send terminal, apparatus for coupling any MIDI output signal to the RS 232 terminal, the apparatus for coupling including apparatus for shifting a base level at which the signals are presented at the MIDI terminal to a base level at which the signals are received at the RS 232 terminal, apparatus for shifting the voltage swing of signals presented at the MIDI terminal to a voltage swing at which the signals are received at the RS 232 terminal, and apparatus for disabling the RS 232 terminal if a device to which the RS 232 terminal is connected would normally respond in an undesirable manner to unexpected data received on the RS 232 terminal.

18 Claims, 1 Drawing Sheet

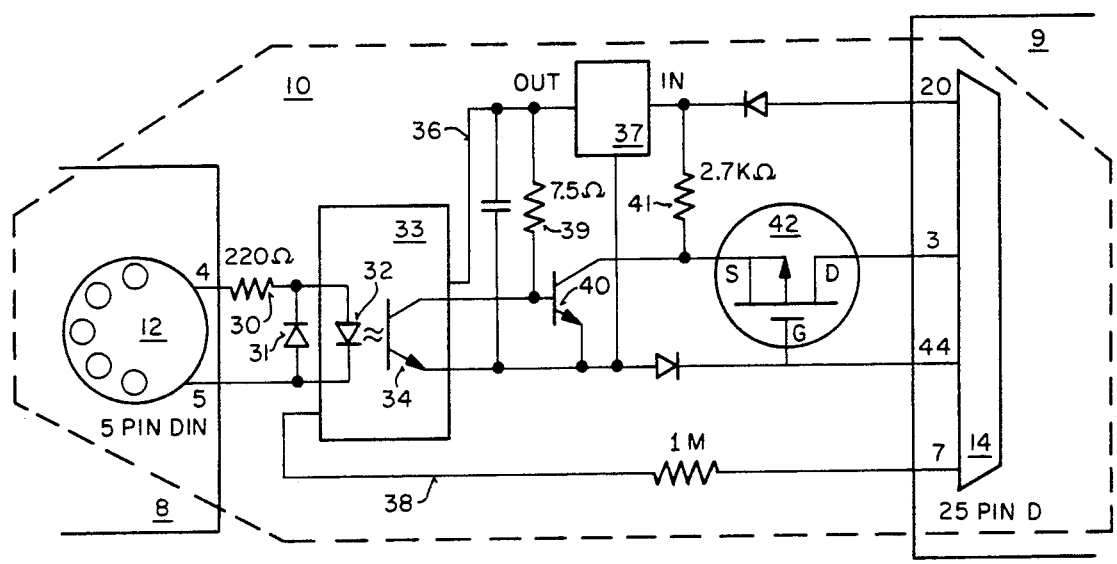
FIG_1
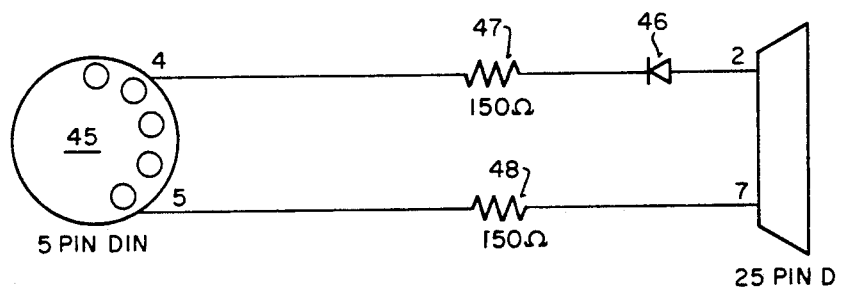
FIG_2

MIDI TO RS 232 INTERFACE

BACKGROUND OF THE INVENTION

1. Field of the Invention

This invention relates to computer systems and, more particularly, to apparatus for providing an interface connection between a device operating on signals provided in the MIDI standard and a device capable of of sending and receiving signals through a standard RS 232 interface.

2. History of the Prior Art

The computer industry is presently trying to provide systems which allow an operator to receive, utilize, and transmit information from many different sources. A primary one of these sources is sound systems. As the electronics industry has converted to systems which use digital signals for transferring and manipulating sound, it has developed a standard referred to as MIDI for handling those signals. In general, the MIDI standard provides that certain signals will be available at certain terminals of a defined five-pin plug connector. Most computer systems developed to date are not equipped with MIDI terminals so input is handled through a RS 232 serial terminal with which most desktop computers are equipped.

Unfortunately, although RS 232 terminals are designed to a standard, all RS 232 terminals are not the same. For example, some RS 232 terminals transfer and receive signals which vary by a maximum of fifteen volts from a standard ground voltage while others transfer and receive signals which vary by a minimum of only three volts. Some computers provide the voltage variation from a base of ground while other computers provide the voltage variation from some other base. Some computers have provision for automatically sensing input signals and refuse to operate when a voltage level appears at particular pins upon start up.

For all of these reasons, MIDI to RS 232 interfaces are not what would normally be termed standard throughout the industry and have heretofore been provided on an ad hoc basis.

SUMMARY OF THE INVENTION

It is, therefore, an object of the present invention to provide a MIDI to RS 232 interface which may be used with a plurality of varying systems.

It is another more specific object of the present invention to provide a MIDI to RS 232 interface which is capable of automatically responding to signals having different voltage levels.

It is yet another object of the present invention to provide a MIDI to RS 232 interface which requires no external power source for operation.

It is an additional object of the present invention to provide a MIDI to RS 232 interface which automatically transfers signals to a MIDI terminal even though the terminal does not normally respond when a voltage level exists on the receive input line at computer power up.

These and other objects of the present invention are realized in an interface which comprises a MIDI send terminal having first and second pins for providing an output signal, an RS232 terminal having first and second pins for receiving a signal from the MIDI send terminal, means for coupling any MIDI output signal to the RS 232 terminal, the means for coupling including means for shifting a base level at which the signals are presented at the MIDI terminal to a base level at which the signals are received at the RS 232 terminal, means for shifting the voltage swing of signals presented at the MIDI terminal to a voltage swing at which the signals are received at the RS 232 terminal, and means for disabling the RS 232 terminal if a device to which the RS 232 terminal is connected would normally respond to received data on system power up.

These and other objects and features of the invention will be better understood by reference to the detailed description which follows taken together with the drawings in which like elements are referred to by like designations throughout the several views.

BRIEF DESCRIPTION OF THE DRAWINGS

FIG. 1 is a partially block/partially schematic diagram illustrating one portion of the invention.

FIG. 2 is a schematic diagram illustrating another portion of the invention.

DETAILED DESCRIPTION OF THE INVENTION

Referring now to FIG. 1, there is illustrated an interface 10 constructed in accordance with the invention for sending signals from a MIDI equipment 8 to a computer or other device 9 equipped with an RS 232 terminal. This MIDI interface shall be referred to as the MIDI Interface 10. The interface 10 includes a standard 5-pin Din terminal 12 utilized in accordance with the MIDI standard for providing output signals. At such a terminal 12, output signals are provided across the 4 and 5 pins in accordance with the MIDI standard, and for that reason, only the connections to the 4 and 5 pins are shown. The MIDI interface 10 also includes a standard 25-pin D terminal 14 utilized in accordance with the RS 232 standard for sending and receiving signals at a computer (not shown in the figures). Only the connections to the received data (RD) pin 3, request-to-send (RTS) pin 44, signal ground (SG) pin 7, and data terminal ready (DTR) pin 20 of the RS 232 terminal are illustrated in FIG. 1 since those are the only connections in the present invention having a bearing on the receipt of signals from a MIDI terminal. Similarly, only the connections to the transmitted data (TD) pin 2 and SG pin 4 of the RS 232 terminal are illustrated in FIG. 2, since those are the only connections in the present invention having a bearing on the receipt of signals from a computer or other device 9 equipped with an RS 232 terminal.

Connected to the 4 pin of the MIDI terminal is a resistor 30 which is connected to a parallel arrangment including reversed diodes 31 and 32. The other end of the parallel diode arrangement is connected to the 5 pin of the MIDI terminal 12. The parallel arrangement of diodes 31 and 32 allows signals in only one direction to be transferred by the MIDI interface 10. The diode 32 is a light emitting diode which provides a light signal to a light sensitive transistor 34. The diode 32 and the light sensitive transistor 34 are part of an optical isolator 33 which in a preferred embodiment may be a PC900 Opto Isolator manufactured by Sharp. The optical isolator arrangement 33 is used in order to decouple the signals presented at the MIDI terminal 12 from the base voltage level at which those signals appear at the RS 232 terminal 14. This allows components providing input signals at a particular base voltage level at the MIDI terminal 12 to be used with components which receive those signals at different voltage levels. Thus, the MIDI interface 10 may operate with components whatever their base voltage level may be.

The transistor 34 of the optical isolator 33 is adapted to provide digital output signals which may be utilized by the RS 232 terminal 14 and, ultimately, any device of which that terminal 14 is a part. When functioning with RS 232 terminals providing output signals at a first voltage level, a first particular optical isolator 33 would normally be used, while when functioning with RS 232 terminals providing output signals at a second voltage level, a second particular optical isolator 33 would normally be used. The arrangement of the present invention allows a single optical isolator 33 and thus a single interface 10 to be used with computers operating with signals at two or more different voltage swing levels.

This is accomplished by providing an arrangement for providing consistent operating levels to the optical isolator 33 even though the voltage signals at the RS 232 terminal 14 varies with the associated computer. Connected to the optical isolator 33 is a conductor 36 from a voltage regulator circuit 37. The voltage regulator circuit 37 receives a signal on a data terminal ready (DTR) pin 20 of the RS 232 terminal 14. The voltage levels of signals at all of the pins used for signaling through an RS 232 terminal are typically the same. Consequently, if the computer places a twelve volt signal on this DTR 20 pin, that level indicates the level of the signals expected by the associated computer. The regulator 37 senses the voltage at the DTR 20 pin and uses that signal to bias the optical isolator 33 for operation. If the signal is a twelve volt signal, the regulator 37 converts the signal to a five volt signal and transfers it to the optical isolator 33 on the line 36. If on the other hand the computer places a five volt signal on the 20 pin, the regulator 37 simply transfers this five volt signal to the optical isolator on the line 36. Ground is transferred in either case on a conductor 38 from SG pin 7 of the RS 232 terminal 14 to the optical isolator 33. In this manner, the optical isolator 33 is correctly biased and able to respond to computers which use either twelve volt or five volt signal swings. In a preferred embodiment of the invention, the voltage regulator circuit 37 may be a 78L05 manufactured by Motorola, a circuit well known in the prior art.

The voltage regulator circuit 37 is connected at its common terminal to the emitter terminal of the transistor 34. The collector of the transistor 34 is connected through a resistor 39 to the five volt output level of the regulator 37. The collector of the transistor 34 is also directly connected to the base of an NPN transistor 40. The collector of the NPN transistor 40 is connected through a resistor 41 to the DTR pin 20 of the RS 232 terminal 14. This connection of the transistor 40 is arranged to both invert and convert the signals from the MIDI source level to signals for the computer (from three to fifteen volts) depending on the level of the voltage at the DTR pin 20. The resistor 41 raises the level of the voltage at the collector of the transistor 40 to the level of the DTR pin 20. For example, if the level of the DTR pin 20 is five volts, the collector is held at five volts. If the level of the DTR pin 20 is twelve volts, the collector is raised to twelve volts. Consequently, the value of the signals in from the MIDI terminal are matched to whatever signal level is used at the computer connected to the RS 232 terminal 14. This allows the interface 10 to operate with computers adapted to work with signals at different levels.

Normally, the signals provided by the MIDI terminal 12 would be furnished directly across the RD pin 3 and RTS pin 44 of the RS 232 terminal 14. However, some computers which may be associated with RS 232 terminals have arrangements which sense signals appearing during power up on RD pin 3 of the RS 232 terminal and determine if signals are present. If there are signals present, then the computer does not respond but considers this to be a break signal. To preclude this result, a P metal oxide field effect transistor (MOSFET) 42 is provided with its gate to source terminals connected across the emitter/collector terminals of the transistor 40. The gate and drain terminals of the MOSFET 42 are connected to the RTS pin 44 and RD pin 3 of the RS 232 terminal 14, respectively. As connected, the MOSFET 42 disconnects the RD pin 3 from receiving signals until the occurrence of a negative signal on the request to send (RTS) pin 4 from the associated computer. Such a signal may be provided by software associated with the computer when utilized with MIDI devices for input. By using the MOSFET 42 to disconnect the receive data (RD) pin 3, the direct connection of the input to the RD pin 3 is removed, and the treatment of the incoming data as a break signal is eliminated.

The circuitry of the invention to transfer MIDI signals from a computer associated with the RS 232 terminal 14 to a MIDI terminal 45 is illustrated in FIG. 2. In the MIDI standard, the terminal for receiving information is separate from the terminal from transmitting the information. As will be obvious from FIG. 2, the arrangement is quite simple. It requires only a conductor connecting the transmitted data (TD) pin 2 of the RS 232 terminal 14 through a diode 46 and a resistor 47 to a 4 pin of the MIDI input terminal 45 and a conductor connecting the signal ground (SG) pin 7 of the RS 232 terminal 14 through a resistor 48 to a 5 pin of the MIDI terminal 45. The diode 46 is placed in the circuit to limit the direction of the current to the MIDI terminal 45.

Thus, there is provided by this invention a MIDI to RS 232 interface which is capable of operating with signals of different levels, is capable of operating with RS 232 terminals having different voltage swings, and which does not treat incoming signals on start up as break signals. The MIDI to RS 232 interface of the invention provides the added advantage of requiring no external power supply for its operation since it operates off the power supplied by the devices with which it is associated.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An interface which comprises:
   a MIDI send terminal having first and second pins for providing a MIDI output signal;
   an RS 232 terminal having a third and a fourth pin for receiving a data input signal to provide data to a device to which the RS 232 terminal is coupled;
   a connecting means for connecting the MIDI output signal presented at the the first and the second pins of the MIDI terminal to the data input signal presented at the third and the fourth pins of the RS 232 terminal, the connecting means including:

a base level shifting means for shifting a first base level at which the MIDI output signal is presented at the first and the second pins of the MIDI terminal to a second base level at which the data input signal is received at the third and the fourth pins of the RS 232 terminal; and a voltage swing shifting means for shifting a first voltage swing of the MIDI output signal presented at the first and the second pins of the MIDI terminal to a second voltage swing at which the data input signal is received at the third and the fourth pins of the RS 232 terminal, the voltage swing shifting means being coupled between the base level shifting means and the RS 232 terminal and having as input a base level shifted signal output by the base level shifting means.

2. An interface as defined in claim 1 wherein the base level shifting means includes:

an optical isolator circuit, the isolator circuit having as input the MIDI output signal and as output the base level shifted signal; and a biasing means for providing a constant level of voltages for biasing the optical isolator circuit, the biasing means having electrical connection to the isolator circuit.

3. An interface as defined in claim 1 in which:

the RS 232 terminal includes a ninth pin for providing a sample source of voltage; and the voltage swing shifting means includes a first switching device having as input the base level shifted signal and as output the data input signal to provide data to the RS 232 terminal, the base level shifted signal being input to the first switching device to control switching of the first switching device, the sample source of voltage provided at the ninth pin of the RS 232 terminal being coupled to, and providing biasing for, the first switching device.

4. An interface as defined in claim 1 further comprising:

a disabling means for disabling the data input signal at the thrid pin of the RS 232 terminal if the device to which the RS 232 terminal is coupled would normally respond to the presence of the data input signal on the third pin by turning off, the disabling means being disposed between the coupling of the voltage swing shifting means and the third pin of the RS 232 terminal.

5. An interface as defined in claim 4 wherein the disabling means includes:

a second switching device coupled between the voltage swing shifting means and the third pin of the RS 232 terminal, biased to provide a normally off state; and an enabling means for enabling the second switching device to transfer signals to the RS 232 terminal, the enabling means coupled to the second switching device.

6. An interface as defined in claim 1 further comprising:

a disabling means for disabling the data input signal at the third pin of the RS 232 terminal if the device to which the RS 232 terminal is coupled would normally respond to the presence of the data input signal on the third pin by turning off, the disabling means being disposed between the coupling of the base level shifting means and the voltage swing shifting means.

7. An interface as defined in claim 6 wherein the disabling means includes:

a second switching device coupled between the base level shifting means and the voltage swing shifting means, biased to provide a normally off state; and an enabling means for enabling the second switching device to transfer signals to the RS 232 terminal, the enabling means coupled to the second switching device.

8. An interface as defined in claim 1 further comprising:

a disabling means for disabling the data input signal at the third pin of the RS 232 terminal if the device to which the RS 232 terminal is coupled would normally respond to the presence of the data input signal on the third pin by turning off, the disabling means being disposed between the coupling of the first pin of the MIDI send terminal and the base level shifting means.

9. An interface as defined in claim 8 wherein the disabling means includes:

a second switching device coupled between the first pin of the MIDI terminal and the base level shifting means, biased to provide a normally off state; and an enabling means for enabling the second switching device to transfer signals to the RS 232 terminal, the enabling means coupled to the second switching device.

10. An interface which comprises:

a MIDI send terminal having first and second pins for providing a MIDI output signal;

an RS 232 terminal having a third and a fourth pin for receiving a data input signal to provide data to a device to which the RS 232 terminal is coupled;

a connecting means for connecting the MIDI output signal presented at the the first and the second pins of the MIDI terminal to the data input signal presented at the third and the fourth pins of the RS 232 terminal, the connecting means including:

a base level shifting means for shifting a first base level at which the MIDI output signal is presented at the first and the second pins of the MIDI terminal to a second base level at which the data input signal is received at the third and the fourth pins of the RS 232 terminal; and a voltage swing shifting means for shifting a first voltage swing of the MIDI output signal presented at the first and the second pins of the MIDI terminal to a second voltage swing at which the data input signal is received at the third and the fourth pins of the RS 232 terminal, the voltage swing shifting means being coupled between the MIDI terminal and the base level shifting means and having as output a voltage swing shifted signal to be input to the base level shifting means.

11. An interface as defined in claim 10 wherein the base level shifting means includes:

an optical isolator circuit, the isolator circuit having as input the voltage swing shifted signal and as output the data input signal to provide data to the RS 232 terminal; and a biasing means for providing a constant level of voltages for biasing the optical isolator circuit, the biasing means having electrical connection to the isolator circuit.

12. An interface as defined in claim 10 in which:

the RS 232 terminal includes a ninth pin for providing a sample source of voltage; and the voltage swing shifting means includes a first switching device having as input the MIDI output signal and as output the voltage swing shifted signal, the voltage swing shifted signal being input to the first switching device to control switching of the first switching device, the sample source of voltage provided at the ninth pin of the RS 232 terminal being coupled to, and providing biasing for the first switching device.

13. An interface as defined in claim 10 further comprising:
a disabling means for disabling the data input signal at the third pin of the RS 232 terminal if the device to which the RS 232 terminal is coupled would normally respond to the presence of the data input signal on the third pin by turning off, the disabling means being disposed between the coupling of the base level shifting means and the third pin of the RS 232 terminal.

14. An interface as defined in claim 13 wherein the disabling means includes:
a second switching device coupled between the base level shifting means and the third pin of the RS 232 terminal, biased to provide a normally off state; and
an enabling means for enabling the second switching device to transfer signals to the RS 232 terminal, the enabling means coupled to the second switching device.

15. An interface as defined in claim 10 further comprising:
a disabling means for disabling the data input signal at the third pin of the RS 232 terminal if the device to which the RS 232 terminal is coupled would normally respond to the presence of the data input signal on the third pin by turning off, the disabling means being disposed between the coupling of the voltage swing shifting means and the base level shifting means.

16. An interface as defined in claim 15 wherein the disabling means includes:
a second switching device coupled between the voltage swing shifting means and the base level shifting means, biased to provide a normally off state; and
an enabling means for enabling the second switching device to transfer signals to the RS 232 terminal, the enabling means coupled to the second switching device.

17. An interface as defined in claim 10 further comprising:
a disabling means for disabling the data input signal at the third pin of the RS 232 terminal if the device to which the RS 232 terminal is coupled would normally respond to the presence of the data input signal on the third pin by turning off, the disabling means being disposed between the coupling of the first pin of the MIDI send terminal and the third input terminal of the voltage swing shifting means.

18. An interface as defined in claim 17 wherein the disabling means includes:
a second switching device coupled between the first pin of the MIDI terminal and the voltage swing shifting means, biased to provide a normally off state; and
an enabling means for enabling the second switching device to transfer signals to the RS 232 terminal, the enabling means coupled to the second switching device.

* * * * *